United States Patent

[11] 3,613,016

[72] Inventor Sheldon L. Simmons
Ventura, Calif.

[21] Appl. No. 868,372
[22] Filed Oct. 22, 1969
[45] Patented Oct. 12, 1971
[73] Assignee The United States of America as represented by the Secretary of the Navy

[54] ZERO PHASE SHIFT FILTER
4 Claims, 3 Drawing Figs.

[52] U.S. Cl. .......... 328/167, 328/127, 328/155
[51] Int. Cl. .......... H04b 15/00
[50] Field of Search .......... 328/155, 167, 127; 330/107, 109, 124, 30 D; 307/295

[56] References Cited

UNITED STATES PATENTS

| | | | |
|---|---|---|---|
| 3,322,970 | 5/1967 | Batteau .......... | 307/295 |
| 3,421,141 | 1/1969 | Meyerhoff .......... | 328/167 X |
| 3,465,276 | 9/1969 | Silva et al. .......... | 328/155 X |
| 3,466,552 | 9/1969 | Sels .......... | 307/295 X |
| 3,529,245 | 9/1970 | Single .......... | 328/127 |

*Primary Examiner*—John S. Heyman
*Attorneys*—Richard S. Sciascia, Q. Baxter Warner and Howard J. Murray, Jr.

ABSTRACT: A zero phase shift filter effective over a wide frequency range. It is made up of a dynamically bounded differentiator, acting as a lead network, together with an integrator, the overall circuit having a total phase shift approaching 0° over a frequency band up to 10 octaves.

INVENTOR
SHELDON L. SIMMONS
BY [signature] AGENT
[signature] ATTORNEY

ZERO PHASE SHIFT FILTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

In many electronic applications where filters are utilized an objectionable shift in phase occurs when the input signal passes therethrough. If the phase of the signal conveys a part or all of the data, the filter output may not be truly representative of the information being conveyed.

One approach to the problem has been to employ a tracking filter, which ties the phase of the output signal to that of the input signal by following the latter as it varies over the passband. However, not only are such tracking filters of complex design, but their cost is often prohibitive and in addition the possibility of a malfunction can not always be tolerated.

Another expedient has been to employ linear filtering techniques, two filters having phase variations in opposite sense being connected in series in an attempt to compensate for the overall phase shift. However, it is found that the slope of the characteristic curve increases with decreasing bandwidth, so that variations in phase cannot be overcome without adversely affecting the selective properties of the filter itself.

SUMMARY OF THE INVENTION

The present concept combines a lead network with an integrator to form a lag-free filter especially suitable for incorporation into a servoloop in order to extend the corner frequency of a servomotor while retaining a high gain at the low end of the passband. A feature of the concept resides in the attainment of controllable gain over a wide frequency range without introducing the instability and/or high noise conventionally associated with such control. An essential factor in the invention operation is the dynamic bounding of the output data as a continuous function of the input data.

OBJECTS OF THE INVENTION

One object of the present invention, therefore, is to provide a filter having essentially zero phase shift over a wide frequency range.

Another object of the invention is to provide a zero phase shift filter made up of a lead network and an integrator, the lead network acting as a dynamically bounded differentiator.

A further object of the invention is to provide a lag-free wide-band filter especially suitable for incorporation into a servoloop without introducing instability or raising the noise level of the system.

Other objects, advantages, and novel features of the invention will become apparent from the following detailed description of the invention when considered in conjunction with the accompanying drawings.

SHORT DESCRIPTION OF THE DRAWINGS

DESCRIPTION OF THE PREFERRED EMBODIMENT

Although capable of incorporation into a large number of electronic filtering applications, such for example as those found in data processors, analog simulators and computing networks, a filter designed according to the principles of the present invention is particularly suitable for employment in a feedback circuit to control the operation of a servomechanism by providing controllable gain over a wide dynamic range, by increasing stability of operation, and be reducing the followup error. Accordingly, the concept will be described in connection with such a servosystem, one type of which is illustrated in FIG. 1 of the drawings, although obviously the invention principles are not in any way limited to the particular arrangement selected as exemplary.

Figure 1:
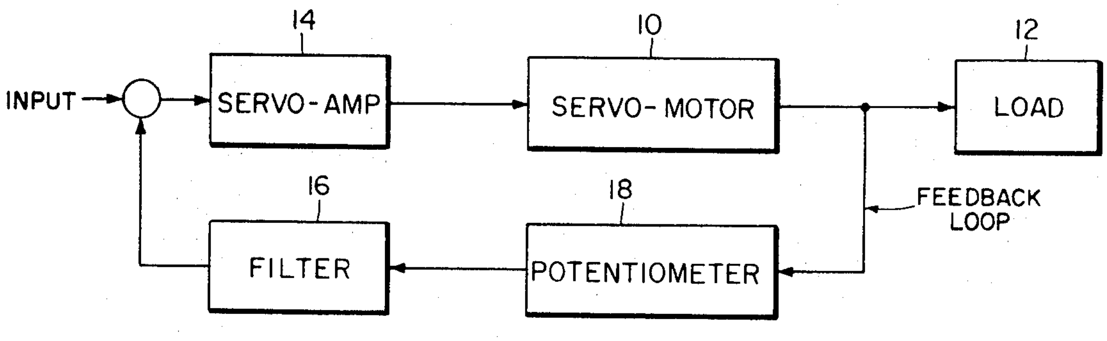
FIG. 1 is a block diagram of a type in which the present concept finds particular application.

The standard feedback network of FIG. 1 includes a servomotor 10 driving a load 12, the motor 10 receiving an input signal through an amplifier 14. A portion of the motor output is fed back to the input of amplifier 14 through a filter 16, the amplitude of the feedback energy being controlled by some means such as a potentiometer 18. In conventional networks of this type, the filter 16 introduces an objectionable phase shift into the feedback signal passing therethrough, and it is a principal object of the present invention to improve system response by eliminating this objectionable shift in signal phase.

Conventional filters frequently utilized in electronic applications include the Bessel, Butterworth, Tchebyscheff, transversal, predictor and tapped delay line types. All of these possess inherent phase shift with frequency change. Three-pole Bessel filters are generally considered to have superior minimization of such phase shift—minus 67.5° at one octave above $f_c$.

Figure 2:
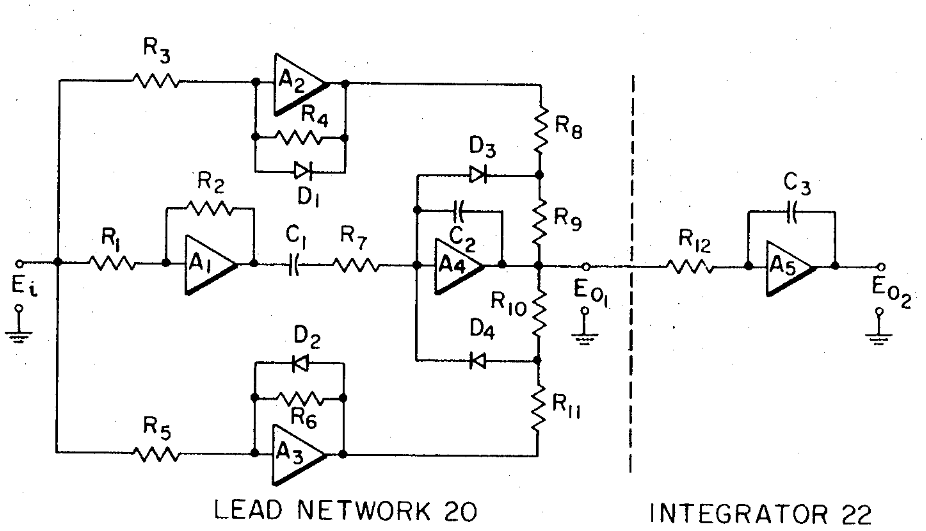
FIG. 2 is a schematic circuit diagram of one form of zero phase shift filter designed in accordance with a preferred embodiment of the present invention.

Referring now to FIG. 2 of the drawings, it will be recognized that the particular embodiment of the present invention there illustrated is made up of two sections—a lead network 20 and an integrator 22. The concept is based upon the principle that, for the lead network 20, $$E_{o1}=E'$$

where $$E_{o1}=\text{output of network 20}$$

$$E_i=\text{input to filter}$$

and $$|E'|\leq|E_i|$$

For the complete filter of Fig. 2

$$E_{o2}=\int_0^T (E')\frac{de}{dt}$$

where $$E_{o2}=\text{output of the filter}$$

$$E'=f(E_i)$$

$$e=f(E')$$

$$|E'|\leq|E_i|$$

The essence of the present concept as exemplified by the circuit of Fig. 2 is an ability to perform the operation $$E_o=E_i'$$

where $$|E_o|\leq|E_i'|$$

This operation provides an approximate phase lead of 90°, and by dynamic bounding (to be discussed hereinafter) assures that the data-level-out will never exceed the data-level-in.

Classical active-element differentiators have the following gain vs. frequency relationship:

$$-e=Tpe_i$$

Such a differentiator, followed by an integrator with the typical gain vs. frequency relationship of $$-e=\frac{1}{Tp}e_i$$

results in an overall gain vs. frequency relationship of $$+e=Tp_i(1/Tp)=e_i$$

Thus, in using the classical differentiator with a classical integrator, no filtering (that is, amplitude attenuation as a function of data frequency changes) occurs.

When using the network of FIG. 2, however, the following relationship holds:

$$-e=(e_i)(1/Tp)$$

and the filter approximates the performance of a true integrator *without* the normal resultant phase lag. This results from the principle of dynamic bounding of the output signal.

Considering now the details of the lead network 20 of FIG. 2, it will be apparent that three parallel paths are provided for the input signal $E_i$. One path includes an operational amplifier $A_1$ in series with resistor $R_1$, this combination being further in series with capacitor $C_1$, resistor $R_7$, and a further amplifier $A_4$. A resistor $R_2$ shunts amplifier $A_1$, and a capacitor $C_2$ shunts amplifier $A_4$. Two diode-resistor combinations $R_9$–$D_3$ and $R_{10}$–$D_4$ are connected in parallel both with each other and with amplifier $A_4$, as shown. The output terminal at which voltage $\overline{E}_{o_1}$ appears is between resistors $R_9$ and $R_{10}$.

A second signal path includes an operational amplifier $A_2$ in series with resistors $R_3$ and $R_8$. Shunting amplifier $A_2$ is the parallel combination of resistor $R_4$ and diode $D_1$. Similarly, a third signal path includes operational amplifier $A_3$ in series with resistors $R_5$ and $R_{11}$, the parallel combination of resistor $R_6$ and diode $D_2$ shunting amplifier $A_3$ as brought out in the drawing.

In operation, a signal $e_i$ applied to the input terminal flows through three paths respectively headed by resistors $R_1$, $R_3$ and $R_5$. Amplifiers $A_2$ and $A_3$ are half-wave rectifiers with precision gain characteristics. $A_1$ is an inverting amplifier. The respective outputs of $A_2$ and $A_3$ provide voltage levels for the *dynamic bounding* of the output data at $\underline{E}_{o_1}$.

$C_1$, $D_3$, $D_4$ and $A_4$ form a differentiator. The output of $A_4$ is *continuously limited* by $A_2$, $R_8$, $R_9$ and $D_3$, as well as by $A_3$, $R_{11}$, $R_{10}$ and $D_4$, so that $$\underline{|E_{o_1}| \leq |E_i|}$$

on a dynamic basis.

The integrator 22 of FIG. 2 comprises the series combination of a resistor $R_{12}$ and an amplifier $A_5$, the latter being shunted by capacitor $C_3$. The output of the complete filter appears at $E_{o_2}$, as illustrated.

The following exemplary values for the components of FIG. 2 have been found to be satisfactory in practice:

$R_1$, $R_2$, $R_{12}$=1 megohm
$R_3$, $R_4$, $R_5$, $R_6$=100 kilohm
$R_7$=120 ohm
$R_8$, $R_9$, $R_{10}$, $R_{11}$=1 kilohm
$C_1$=1 $\mu$fd.
$C_2$=0.003 $\mu$fd.
$C_3$=0.075 $\mu$fd.
$A_1$, $A_2$, $A_3$, $A_4$, $A_5$ = operational amplifiers
$D_1$, $D_2$, $D_3$, $D_4$ = diodes When components having these values are employed in the circuit of FIG. 2, a sine wave input $e_i$ produces an insertion loss of −3 db. at 0.175 Hz., and an insertion loss of −26 db. at 10 Hz. Furthermore, the phase shift approaches zero over a frequency range from 0.1 to 100 Hz.

Figure 3:
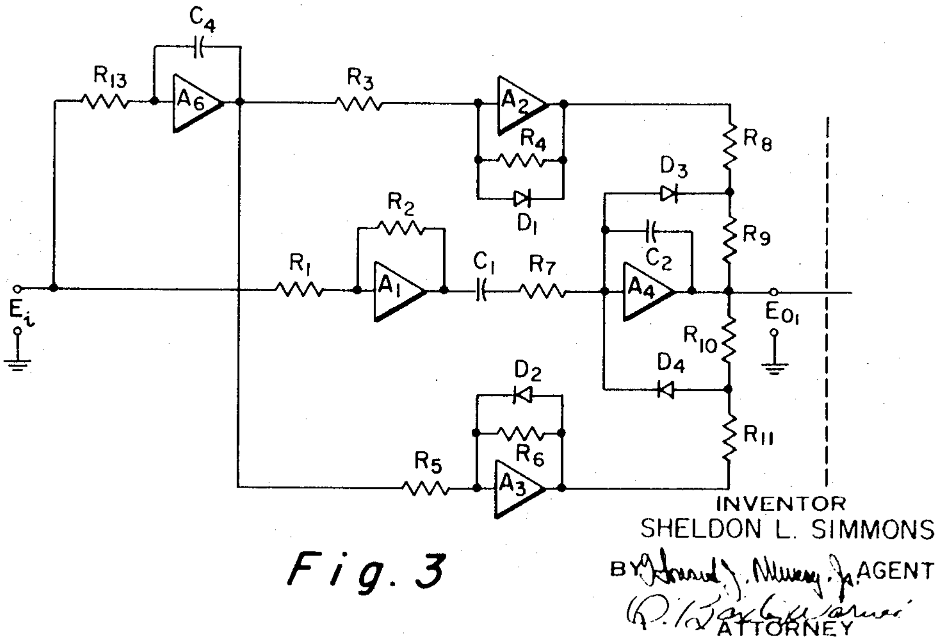
FIG. 3 is a modification of one portion of the circuit of FIG. 2.

Since the operation of the differentiator 20 can optionally be expressed as $$e_o = Ke_i,$$

and is not restricted to $e_o = e_i$, the arrangement of FIG. 2 may be extended as shown in FIG. 3 of the drawings by the provision of a further amplifier $A_6$, capacitor $C_4$ and resistor $R_{13}$ incorporated into the two paths respectively containing the amplifiers $A_2$ and $A_3$. In this circuit of FIG. 3, K becomes $$1/RwC,$$

and when such a differentiator is followed by the integrator 22, the filter has the output characteristic $$E_o = (1/RwC)^2\, E_i$$

and possesses essentially zero phase shift.

I claim:

1. An electrical filter designed to pass with essentially zero phase shift an input signal varying over a frequency band up to approximately 10 octaves, said filter comprising:
   - a differentiating network receiving at least a portion of said input signal;
   - an integrator receiving the output of said differentiating network; and
   - means for dynamically bounding the output of said differentiating network as a continuous function of variations in said input signal, so that the level of the data received by said integrator does not exceed the level of the data represented by the input signal variations.

2. An electrical filter according to claim 1 in which the means for dynamically bounding the output of said differentiating network includes a pair of half-wave rectifiers respectively forming part of two signal paths each of which is connected in essentially parallel relationship with said differentiating network and each of which receives a portion of said input signal.

3. An electrical filter according to claim 2 in which each of the two signal paths which includes one of said pair of half-wave rectifiers also includes a parallel diode-resistor combination shunting the particular half-wave rectifier included in that path.

4. An electrical filter according to claim 3, further including an amplifier, a series resistor R, and a capacitor C shunting said amplifier, all of such further components forming a common part of each of said two signal paths, whereby the output characteristic $E_o$ of the filter becomes $(1/RwC)^2\, E_i$ where $E_i$ is the input signal to said differentiating network.